United States Patent
Van de Bergh

[11] Patent Number: 5,905,014
[45] Date of Patent: May 18, 1999

[54] RADIATION IMAGE STORAGE PANEL COMPRISING A COLORANT

[75] Inventor: Rudolf Van de Bergh, Herenthout, Belgium

[73] Assignee: Agfa-Gevaert, N.V., Mortsel, Belgium

[21] Appl. No.: 09/042,463

[22] Filed: Mar. 16, 1998

Related U.S. Application Data

[60] Provisional application No. 60/045,085, Apr. 29, 1997.

[30] Foreign Application Priority Data

Mar. 19, 1997 [EP] European Pat. Off. ............. 97200811

[51] Int. Cl.$^6$ ...................................................... G21K 4/00
[52] U.S. Cl. ...................... 430/139; 430/966; 250/484.4
[58] Field of Search .................................... 430/139, 966; 250/484.4

[56] References Cited

U.S. PATENT DOCUMENTS 4,675,271  6/1987  Siemens .
5,523,114  6/1996  Tong et al. ................................ 427/68

FOREIGN PATENT DOCUMENTS 0 028 521 A1   5/1981   European Pat. Off. .
0 253 348 A2   1/1988   European Pat. Off. .
0 253 348 A3   1/1988   European Pat. Off. .
0 288 038 A1  10/1988   European Pat. Off. .

*Primary Examiner*—John A. McPherson
*Attorney, Agent, or Firm*—Breiner & Breiner

[57] ABSTRACT

A radiation image storage panel is provided having a support, an intermediate layer and a phosphor layer comprising a binder and a stimulable phosphor dispersed therein, said panel being colored with a colorant so that the mean reflectance of said panel in the wavelength region of the stimulating rays for said stimulating phosphor is lower than the mean reflectance of said panel in the wavelength region of the light emitted by said stimulable phosphor upon stimulation thereof, characterized in that said colorant is a triarylmethane dye having at least one aqueous alkaline soluble group and is present in at least one of said support, said phosphor layer or an intermediate layer between said support and said phosphor layer.

13 Claims, 1 Drawing Sheet

FIG. 1

RADIATION IMAGE STORAGE PANEL COMPRISING A COLORANT

This application claims the benefit of U.S. Provisional application Ser. No. 60/045,085 filed Apr. 29, 1997.

DESCRIPTION

1. Field of the Invention.

The present invention relates to a radiation image storage panel having a fluorescent layer comprising a binder and a stimulable phosphor dispersed therein.

2. Background of the Invention

In radiography the interior of objects is reproduced by means of penetrating radiation which is high energy radiation belonging to the class of X-rays, γ-rays and high energy elementary particle radiation, e.g. β-rays, electron beam or neutron radiation. For the conversion of penetrating radiation into visible light and/or ultraviolet radiation luminescent substances are used called phosphors.

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation whereto a photographic film is more sensitive than to the direct impact of the X-rays.

In practice the light emitted imagewise by said screen irradiates a contacting photographic silver halide emulsion layer film which after exposure is developed to form therein a silver image in conformity with the X-ray image.

As a further development described e.g. in U.S. Pat. No. 3,859,527 an X-ray recording system is disclosed wherein photostimulable storage phosphors are used that in addition to their immediate light emission (prompt emission) on X-ray irradiation, have the property to store temporarily a large part of the energy of the X-ray image which energy is set free by photostimulation in the form of light different in wavelength characteristic from the light used in the photostimulation. In said X-ray recording system the light emitted on photostimulation is detected photo-electronically and transformed in sequential electrical signals.

The basic constituents of such X-ray imaging system operating with storage phosphors are an imaging sensor containing said phosphor, normally a plate or panel, which temporarily stores the X-ray energy pattern, a scanning laser beam for photostimulation, a photo-electronic light detector providing analog signals that are converted subsequently into digital time-series signals, normally a digital image processor which manipulates the image digitally, a signal recorder, e.g. magnetic disk or tape, and an image recorder for modulated light-exposure of a photographic film or an electronic signal display unit, e.g. cathode ray tube. A survey of lasers useful in the read-out of photostimulable latent fluorescent images is given in the periodical Research Disclosure Volume 308 No. 117 p.991, 1989.

From the preceding description of said two X-ray recording systems operating with X-ray conversion phosphor screens in the form of a plate or panel it is clear that said plates or panels serve only as intermediate imaging elements and do not form the final record. The final image is made or reproduced on a separate recording medium or display. The phosphor plates or sheets can be repeatedly re-used. Before re-use of the photostimulable phosphor panels or sheets a residual energy pattern is erased by flooding with light.

From the point of view of image quality of the image storage panels, especially with respect to sharpness, the said sharpness does not depend upon the degree of spread of the light emitted by the stimulable phosphor in the panel, but depends on the degree of spread of the stimulable rays in the panel: in order to reduce this spread of light a mixture can be made of coarser and finer batches to fill the gaps between the coated coarser phosphor particles. A better bulk factor may be attained by making a mixture of coarser and finer phosphor grains resulting in a loss in sensitivity unless the said phosphor grains are only slightly different in sensitivity. For intensifying screens this topic has already be treated much earlier by Kali-Chemie and has been patented in U.S. Pat. Nos. 2,129,295; 2,129,296 and 2,144,040. Radiographs showing improved visualisation, comprising therefore a blue-light absorbing (yellow) dye have been described in EP-A 0 028 521.

Especially the phosphor layer thickness can give rise to increased unsharpness of the emitted light, this being the more unfavourable if the weight ratio between the amount of phosphor particles and the amount of binder decreases for the same coating amount of said phosphor particles.

Enhancing the weight ratio amount of phosphor to binder to provide sharper images, by decreasing the amount of binder leads to unacceptable manipulation characteristics of the screen due to e.g. insufficient elasticity and brittleness of the coated phosphor layer in the screen.

One way to get thinner coated phosphor layers without changing the coated amounts of pigment and of binder makes use of a method of compressing the coated layer containing both ingredients at a temperature not lower than the softening point or melting point of the thermoplastic elastomer as has been described in EP-A 0 393 662.

Another way free from compression manufacturing techniques has been proposed in WO 94/0531, wherein the binding medium comprises one or more rubbery and/or elastomeric polymers providing improved elasticity of the screen, high protection against mechanical damage, high ease of manipulation, high pigment to binder ratio and an improved image quality, especially sharpness.

Early references referring to the improvement of sharpness of radiation image storage panels are related with the addition of a colorant to the panels. So in U.S. Pat. No. 4,394,581 a dye or colorant is added to the panel so that the mean reflectance of said panel in the wavelength region of the stimulating rays for said stimulating phosphor is lower than the mean reflectance of said panel in the wavelength region of the light emitted by said stimulable phosphor upon stimulation thereof. In U.S. Pat. No. 4,491,736 more specifically an organic colorant is disclosed which does not exhibit light emission of longer wavelength than that of the stimulating rays when exposed thereto. EP-A 0 165 340 and the corresponding U.S. Pat. No. 4,675,271 disclose a storage phosphor screen showing a better image definition by incorporation of a dye. An analogous effect brought about in phosphor layers of image storage panels by incorporation of dyes or colourants has further been described in EP-A 0 253 348 and the corresponding U.S. Pat. No. 4,879,202 and in EP-A 0 288 038.

It is however an ever lasting demand to further direct investigations to improve sharpness.

OBJECTS OF THE INVENTION

Therefore it is an object of the present invention to provide a radiation image storage panel coloured with a dye which gives an excellent image resolution. Other objects and advantages will become clear from the following description and examples.

SUMMARY OF THE INVENTION

In accordance with the present invention a radiation image storage panel is provided having a support, an intermediate layer and a fluorescent layer comprising a binder and a stimulable phosphor dispersed therein, said panel being colored with a colorant so that the mean reflectance of said panel in the wavelength region of the stimulating rays for said stimulating phosphor is lower than the mean reflectance of said panel in the wavelength region of the light emitted by said stimulable phosphor upon stimulation thereof, characterized in that said colorant is a triarylmethane dye having at least one aqueous alkaline soluble group and is present in at least one of said support, said phosphor layer or an intermediate layer between said support and said phosphor layer.

DETAILED DESCRIPTION OF THE INVENTION

In order to fulfill the requirement to prevent scattering of irradiation or rays having a stimulating energy for the storage phosphors coated in the phosphor layer(s) of the storage panel according to the present invention, the choice of a colourant having an absorption as high as possible in the wavelength range of the stimulating rays and an absorption as low as possible in the wavelength range of the emitted radiation has lead us to triarylmethane dyes having at least one aqueous alkaline soluble group as perfectly suitable dyes for the purposes set forth above.

From this class of triarylmethane dyes, the most preferred dyes have a structure, the general formula (I) of which is given hereinafter, wherein $R^1$–$R^8$ each independently represents hydrogen, (substituted or unsubstituted) alkyl or (substituted or unsubstituted) aryl, provided that at least one of $R^1$–$R^8$ represents an acidic group like e.g. a carboxylic acid group or a sulphonic acid group in order to provide solubility in alkaline medium in salt form.

(I)

The formulae II to IV are preferred representatives, given hereinafter (III)

-continued (IV)

The most preferred dye, corresponding to the formula (II), is provided by Hoechst AG, Germany, in dispersed form and is, due to its performance with respect to the requirements set forth above, especially suitable for use in storage panels according to the present invention, opposite to other blue dyes as e.g. Valifast Blue 1605 and Zapon Fast Blue 3G (manufactured by Hoechst AG), Estrol Brill Blue N-3RL (manufactured by Sumitomo Kagaku Co., Ltd.), Sumiacryl Blue F-GSL (manufactured by Sumitomo Kagaku Co., Ltd.), D&C Blue No. 1 (manufactured by National Anilin Co., Ltd.), Spirit Blue (manufactured by Hodogaya Kagaku Co., Ltd.), Oil Blue No. 603 (manufactured by Orient Co., Ltd.), Kiton Blue A (manufactured by Ciba-Geigy AG).

Figure 1:
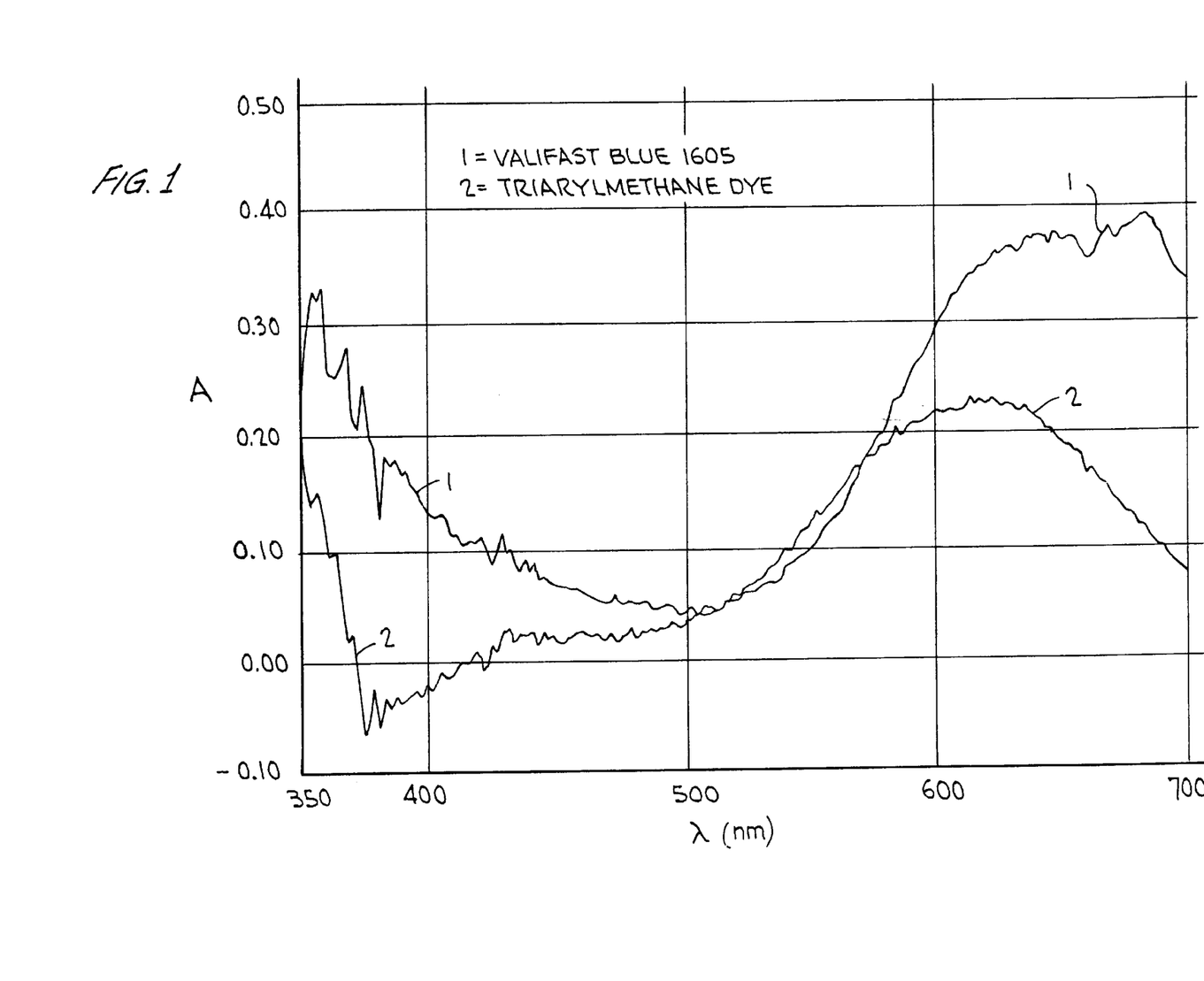
FIG. 1 shows an absorption signal as a function of wavelength for a dye of the present invention and a dye of the prior art.

As has been shown in FIG. 1 the ratio between absorption signals measured in the wavelength range of the stimulable rays (between 500 and 700 nm) and absorption signals in the wavelength range of radiation emitted by the stimulable phosphors upon stimulation (between 350 and 450 nm) is clearly in favour of the triarylmethane dyes used in storage panels according to the present invention if compared with a dye as e.g. the already mentioned Valifast Blue 1605, presented in the said FIG. 1 as a comparative dye.

In a preferred embodiment an intermediate light-absorbing layer comprising one or more triarylmethane dye(s) is provided between the phosphor-containing layer and the support and/or in the support itself in order to avoid scattering of light at the interface of the support and the layer containing the phosphor layer, thereby increasing the image resolution of the photostimulable phosphor screen. Particularly substituted triarylmethane dyes having a relatively high solubility in protic or polar solvents as alcohol are preferred as no diffusion to an adjacent phosphor layer, coated from apolar solvents, occurs. Preferred substituted triarylmethane dyes therefore are e.g. triphenylmethane dyes wherein at least one phenyl group is substituted with one or more sulphonic acid group, carboxylic group, etc., or wherein, more generally, the said colorant is a substituted triphenylmethane dye soluble aqueous alkaline medium, due to the presence of such an ionizable acid group.

When the preferred triarylmethane dye or dyes is(are) present in the said light-absorbing intermediate layer the support preferably further comprises reflecting particles in order to have reflecting properties. A support comprising e.g. $TiO_2$ (anatase) particles thereby has reflecting properties, expressed as a degree of reflectance or % reflectance over the wavelength range from 350 to 600 nm, between 45 and 60%. Otherwise a support comprising e.g. $BaSO_4$ particles shows a reflectance percentage between 85 and 100%. In another embodiment the said particles are incorporated in a hardened layer coated onto a support. Said hardenened layers which should be considered also as intermediate layers between support and phosphor layer preferably comprise the preferred blue triarylmethane colorant(s) in order to provide a storage panel according to the present invention. The presence under the phosphor layer(s) of the reflecting layers set forth above, whether or not comprising the preferred blue colorants, is in favour of screen speed. Although such reflectance properties could be expected to be disadvantageous with respect to sharpness, it has now unexpectedly been found that this speed increase or speed compensation of loss of speed due to the presence of antihalation dyes is not disadvantageous with respect to image resolution according to the objects of the present invention.

Another light-reflecting layer which is provided in order to enhance the output of light emitted by photostimulation is a (vacuum-deposited) aluminum layer. In terms of reflection according to the present invention a dye or colorant should have a mean reflectance in the wavelength region of the stimulating rays for said stimulating phosphor that is lower than the mean reflectance in the wavelength region of the light emitted by said stimulable phosphor upon stimulation thereof.

In another embodiment the dye(s) or colorant(s) is(are) additionally present in the phosphor layer itself: it is recommended however to add lower amounts of said dyes than in an intermediate layer and/or in the support in order to overcome speed decrease.

In still another embodiment the dye(s) or colorant(s) is(are) additionally present in the protective layer coated on top of the phosphor layer: in that case it is recommended to add still lower amounts of said dyes than in the phosphor layer, and correspondingly much lower amounts of said dyes in the intermediate layer, in order to prevent further loss in speed of the said screen. Nevertheless its presence is particularly useful when due to light-piping stimulation light enters the protecting overcoat layer, causing thereby unsharpness.

In the phosphor layer an increase in the volume ratio of phosphor to binder further provides a reduction of the thickness of the coating layer for an equal phosphor coverage and in addition not only provides a better sharpness but also offers a higher speed or sensitivity. An extra improvement in image-sharpness can be realised with the thermoplastic rubber binders cited in WO94/0531 because thinner phosphor layers are possible at a higher phosphor to binder ratio. Rubbery binders are preferably chosen because they allow a high volume ratio of pigment to binder, resulting in excellent physical properties and image quality and in an enhanced speed. In that case a small amount of binding agent does not result in too brittle a layer and minimum amounts of binder in the phosphor layer give enough structural coherence to the layer. Especially for storage phosphor members this factor is very important in view of the manipulations said member is exposed to. The weight ratio of phosphor to binder preferably from 80:20 to 99:1. The ratio by volume of phosphor to binding medium is preferably more than 85/15. In this connection a volume ratio of phosphor to binder higher than 92/8 is hardly allowable and is about a maximum value of said volume ratio. A mixture of one or more thermoplastic rubber binders may be used in the coated phosphor layer(s): preferably the binding medium substantially consists of one or more block copolymers, having a saturated elastomeric midblock and a thermoplastic styrene endblock, as rubbery and/or elastomeric polymers as disclosed in WO 94/00530. Particularly suitable thermoplastic rubbers, used as block-copolymeric binders in phosphor screens in accordance with the present invention are the KRATON-G rubbers, KRATON being a trade mark name from SHELL. The phosphor layer preferably has a bound polar functionality of at least 0.5%, a thickness in the range from 10 to 1000 $\mu$m and a ratio by volume of 92:8 or less.

Storage panels as described hereinbefore, according to this invention, may be provided with at least one antioxidant preventing yellowing of the screen. The antioxidant(s) is(are) preferably incorporated in the phosphor layer. The coating dispersion may further contain a filler (reflecting or absorbing).

As is well-known the sensitivity of the screen is determined by the chemical composition of the phosphor, its crystal structure and crystal size properties and the weight amount of phoshor coated in the phosphor layer. The image quality, particularly sharpness, especially depends on optical scattering phenomena in the phosphor layer being determined mainly besides the already mentioned thickness of the phosphor layer by the packing density. Said packing density of the phosphor particles depends on the crystal size distribution of the phosphor particles, their morphology and the amount of binder present in the phosphor layer or layers.

Another factor determining the sensitivity of the screen is the thickness of the phosphor layer, being proportional to the amount of phosphor(s) coated. Said thickness may be within the range of from 10 to 1000 $\mu$m, preferably from 50 to 500 $\mu$m and more preferably from 100 to 300 $\mu$m.

The coverage of the phosphor or phosphors present as a sole phosphor or as a mixture of phosphors whether or not differing in chemical composition and present in one or more phosphor layer(s) in a screen is preferably in the range from about 50 g to 2500 g, more preferably from 200 g to 1750 g and still more preferably from 300 to 1500 g/m$^2$. Said one or more phosphor layers may have the same or a different layer thickness and/or a different weight ratio amount of pigment to binder and/or a different phosphor particle size or particle size distribution. It is general knowledge that sharper images with less noise are obtained with phosphor particles of smaller mean particle size, but light emission efficiency declines with decreasing particle size. Thus, the optimum mean particle size for a given application is a compromise between imaging speed and image sharpness desired. Preferred average grain sizes of the phosphor particles are in the range of 2 to 30 $\mu$m and more preferably in the range of 2 to 20 $\mu$m.

In the phosphor layer(s), any phosphor or phosphor mixture may be coated depending on the objectives that have to be attained with the manufactured storage phosphor screens. Besides mixing fine grain phosphors with more coarse grain phosphors in order to increase the packing density, a gradient of crystal sizes may, if required, be build up in the storage panel. Principally this may be possible by coating only one phosphor layer, making use of gravitation forces, but with respect to reproducibility at least two different storage panels coated from phosphor layers comprising phosphors or phosphor mixtures in accordance with the present invention may be coated in the presence of a suitable binder, the layer nearest to the support consisting essentially of small phosphor particles or mixtures of different batches thereof with an average grain size of about 5 $\mu$m or less and thereover a mixed particle layer with an average grain size from 8 to 20 $\mu$m for the coarser phoshor particles, the smaller phosphor particles optionally being present as interstices of the larger phosphor particles dispersed in a suitable binder. Depending on the needs required the stimulable phosphors in accordance with the present invention or mixtures thereof may be arranged in a variable way in these coating constructions.

It is clear that within the scope of this invention the choice of the phosphor(s) or phosphor mixture(s) is limited in that the radiation image storage panel has a wavelength region of the stimulating rays situated between 500 and 700 nm.

Further in a preferred embodiment according to the present invention said radiation image storage panel has a wavelength region of the light emitted by said stimulable phosphor upon stimulation thereof situated between 350 and 450 nm.

In radiation image storage panels according to the present invention e.g. divalent europium-doped bariumfluorohalide phosphors may be used, wherein the halide-containing portion may be
(1) stoichiometrically equivalent with the fluorine portion as e.g. in the phosphor described in U.S. Pat. No. 4,239,968,
(2) may be substoichiometrically present with respect to the fluorine portion as described e.g. in EP-A 0 021 342 or 0 345 904 and U.S. Pat. No. 4,587,036, or
(3) may be superstoichiometrically present with respect to the fluorine portion as described e.g. in U.S. Pat. No. 4,535,237.

According to U.S. Pat. No. 4,239,968 a method is claimed for recording and reproducing a radiation image comprising the steps of
(i) causing a visible ray- or infrared ray-stimulable phosphor to absorb a radiation passing through an object,
(ii) stimulating said phosphor with stimulation rays selected from visible rays and infrared rays to release the energy of the radiation stored therein as fluorescent light, characterized in that said phosphor is at least one phosphor selected from the group of alkaline earth metal fluorohalide phosphors.

From the stimulation spectrum of said phosphors it can be learned that said kind of phosphor has high sensitivity to stimulation light of a He-Ne laser beam (633 nm) but poor photostimulability below 500 nm. The stimulated light (fluorescent light) is situated in the wavelength range of 350 to 450 nm with a peak at about 390 nm (ref. the periodical Radiology, September. 1983, p.834.).

It can be learned from said U.S. Pat. No. 4,239,968 that it is desirable to use a visible ray (e.g. red light) stimulable phosphor rather than an infra-red ray-stimulable phosphor because the traps of an infra-red-stimulable phosphor are shallower than these of the visible ray-stimulable phosphor and, accordingly, the radiation image storage panel comprising the infra-red ray-stimulable phosphor exhibits a relatively rapid dark-decay (fading).

For solving that problem it is desirable as explained in U.S. Pat. No. 4,239,968 to use a photostimulable storage phosphor which has traps as deep as possible to avoid fading and to use for emptying said traps light rays having substantially higher photon energy (rays of short wavelength).

Attempts have been made to formulate phosphor compositions showing a stimulation spectrum in which the emission intensity at the stimulation wavelength of 500 nm is higher than the emission intensity at the stimulation wavelength of 600 nm. A suitable phosphor for said purpose is described in U.S. Pat. No. 4,535,238 in the form of a divalent europium activated barium fluorobromide phosphor having the bromine-containing portion stoichiometrically in excess of the fluorine. According to U.S. Pat. No. 4,535,238 the photostimulation of the phosphor can proceed effectively with light, even in the wavelength range of 400 to 550 nm.

Although BaFBr:Eu$^{2+}$ storage phosphors, used in digital radiography, have a relatively high X-ray absorption in the range from 30–120 keV, which is a range relevant for general medical radiography, the absorption is lower than the X-ray absorption of most prompt-emitting phosphors used in screen/film radiography, like e.g. LaOBr:Tm, $Gd_2O_2S$:Tb and YTaO$_4$:Nb. Therefore, said screens comprising light-emitting luminescent phosphors will absorb a larger fraction of the irradiated X-ray quanta than BaFBr:Eu screens of equal thickness. The signal to noise ratio (SNR) of an X-ray image being proportional to the square-root of the absorbed X-ray dose, the images made with the said light-emitting screens will consequently be less noisy than images made with BaFBr:Eu screens having the same thickness. A larger fraction of X-ray quanta will be absorbed when thicker BaFBr:Eu screens are used. Use of thicker screens, however, leads to diffusion of light over larger distances in the screen, which causes deterioration of image resolution. For this reason, X-ray images made with digital radiography, using BaFBr screens, as disclosed in U.S. Pat. No. 4,239,968, give a more noisy impression than images made with screen/film radiography.

A more appropriate way to increase the X-ray absorption of phosphor screens is by increasing the intrinsic absorption of the phosphor. In BaFBr:Eu storage phosphors this can be achieved by partly substituting bromine by iodine.

BaFX:Eu phosphors containing large amounts of iodine have been described e.g. in EP-A 0 142 734, the general formula of said phosphor is BaF(Br$_{1-x}$I$_x$):yEu, and $10^{-3} \leq x < 1.0$. In FIG. 3 of said patent application, the relative luminance of BaFX:Eu storage phosphors is shown as a function of the iodine content. It is clear from said FIG. 3 of the disclosure mentioned above, that, although x can be as great as 1.0 according to the general formula, the portion of Br that is replaced by I should preferably not be made higher than 50% since replacement of a larger portion of Br by I, leads to a lower relative luminance, of the light emitted upon stimulation. The relative luminance of the storage phosphor should be as high as possible, since the sensitivity of a storage phosphor system is proportional to the storage phosphor luminance and apart from a high X-ray absorption, a high system sensitivity is essential for reducing image noise. Therefore, in a phosphor as disclosed in EP-A 0 142 734, the gain in image quality, due to the higher absorption of X-rays when more than 50% of iodine is included in the phosphor is offset by the lowering of the relative luminance.

Divalent europium activated barium fluorobromide phosphors suitable for use according to the present invention have further been described in EP-A 0 533 236 and in the corresponding U.S. Pat. Nos. 5,422,220 and 5,547,807. In the said EP-A 0 533 236 a divalent europium activated stimulable phosphor is claimed wherein the stimulated light has a higher intensity when the stimulation proceeds with light of 550 nm, than when the stimulation proceeds with light of 600 nm. It is said that in said phosphor a "minor part" of bromine is replaced by chlorine and/or iodine. By minor part has to be understood less than 50 atom %.

Still other divalent europium activated barium fluorobromide phosphors suitable for use according to the present invention have been described in EP-A 0 533 234. In this EP-A 0 533 234 a process is described to prepare europium-doped alkaline earth metal fluorobromide phosphors, wherein fluorine is present in a larger atom % than bromine, and which have a stimulation spectrum that is clearly shifted to the shorter wavelength region. Therein use of shorter wavelength light in the photostimulation of phosphor panels containing phosphor particles dispersed in a binder is in favour of image-sharpness since the diffraction of stimulation light in the phosphor-binder layer containing dispersed phosphor particles acting as a kind of grating will decrease with decreasing wavelength.

As is apparent from the examples in this EP-A 0 533 234 the ultimately obtained phosphor composition determines the optimum wavelength for its photostimulation and, therefore, the sensitivity of the phosphor in a specific scanning system containing a scanning light source emitting light in a narrow wavelength region.

Other preferred photostimulable phosphors according to the applications mentioned hereinbefore contain an alkaline earth metal selected from the group consisting of Sr, Mg and Ca with respect to barium in an atom percent in the range of $10^{-1}$ to 20 at %. From said alkaline earth metals Sr is most preferred for increasing the X-ray conversion efficiency of the phosphor. Therefore in a preferred embodiment strontium is recommended to be present in combination with barium and fluorine stoichiometrically in larger atom % than bromine alone or bromine combined with chlorine and/or iodine.

Other preferred photostimulable phosphors according to that application contain a rare earth metal selected from the group consisting of Ce, Pr, Nd, Gd, Tb, Dy, Ho, Er, Tm, Yb and Lu with respect to barium in an atom percent in the range of $10^{-3}$ to $10^{-1}$ at %. From said rare earth metals Gd is preferred for obtaining a shift of the maximum of the photostimulation spectrum of the phosphor to the shorter wavelengths.

The preferred phosphors of that application referred to hereinbefore are also preferred for use in the present invention the proviso that, as set forth hereinbefore, the wavelength region of the stimulating rays is between 500 and 700 nm.

Still other preferred photostimulable phosphors for use according to the present invention contain a trivalent metal selected from the group consisting of Al, Ga, In, Tl, Sb, Bi and Y with respect to barium in an atom percent in the range of $10^{-1}$ to 10 at %. From said trivalent metals Bi is preferred for obtaining a shift of the maximum of the photostimulation spectrum of the phosphor to the shorter wavelengths.

Preferred phosphors for use according to this invention are further phosphors wherein fluorine is present stoichiometrically in a larger atom % than bromine taken alone or bromine combined with chlorine and/or iodine, e.g. fluorine is present in 3 to 12 atom % in excess over bromine or bromine combined with chlorine and/or iodine.

Still other particularly suitable barium fluorobromide phosphors for use according to the present invention contain in addition to the main dopant Eu$^{2+}$ at least Sm as codopant as described in EP-A 0 533 233 and in the corresponding U.S. Pat. No. 5,629,125.

Still other useful phosphors are those wherein Ba-ions are partially replaced by Ca-ions at the surface of the phosphors have been described in EP-A 0 736 586.

In digital radiography it can be advantageous to use photostimulable phosphors that can very effectively be stimulated by light with wavelength higher than 600 nm as for phosphors included for use in storage panels according to the present invention, since then the choice of small reliable lasers that can be used for stimulation (e.g. He-Ne, semi-conductor lasers, solid state lasers, etc) is very great so that the laser type does not dictate the dimensions of the apparatus for reading (stimulating) the stimulable phosphor screen.

More recently stimulable phosphors, giving a better signal-to-noise ratio, a higher speed, further being stimulable at wavelengths above 600 nm have therefore been described in EP-Application No. 96202816, filed Oct. 10, 1996. Therein a storage phosphor class has been described providing high X-ray absorption, combined with a high intensity of photostimulated emission, thus allowing to build a storage phosphor system for radiography yielding images that have at the same time a high sharpness and a low noise content, through a decreased level of X-ray quantum noise and a decreased level of fluorescence noise. Further said class of photostimulable phosphors provides a high X-ray absorption, combined with a high intensity of photostimulated emission, showing said high intensity of photostimulated emission when stimulated with light having a wavelength above 600 nm. Said photostimulable phosphors can further be used in panels for medical diagnosis, whereby the dose of X-ray administered to the patient can be lowered and the image quality of the diagnostic image enhanced: in a panel including said phosphor in dispersed form on photostimulation with light in the wavelength range above 600 nm images with very high signal-to-noise ratio are yielded.

Said photostimulable phosphors are within the scope of the following formula:

$$Ba_{1-x-y-p-3q-z}Sr_xM_y^{2+}M_{2p}^{1+}M_{2q}^{3+}F_{2-a-b}Br_aI_b:zEu$$

wherein:

$M^{1+}$ is at least one alkali metal selected from the group consisting of Li, Na, K, Rb and Cs;

$M^{2+}$ is at least one divalent metal selected from the group consisting of Ca Mg and Pb;

$M^{3+}$ is at least one trivalent metal selected from the group consisting of Al, Ga, In, Tl, Sb, Bi, Y or a trivalent lanthanide, e.g. La, Ce, Pr, Nd, Sm, Gd, Tb, Dy, Ho, Er, Tm, Yb and Lu;

$0 \leq x \leq 0.30$, $0 \leq y \leq 0.10$, $10^{-6} \leq z \leq 0.2$, $0 \leq p \leq 0.3$, $0 \leq q \leq 0.1$, $0.05 \leq a \leq 0.76$, $0.20 \leq b \leq 0.90$ and $a+b<1.00$.

In a preferred embodiment $0.06 \leq x \leq 0.20$ and $0.85 \leq a+b \leq 0.96$ and in a further preferred embodiment, $0.06 \leq x \leq 0.20$, $0.85 \leq a+b \leq 0.96$, $M^{1+}$ is Cs or Rb, $M^{2+}$ is Pb, $10^{-4} \leq y \leq 10^{-3}$, $10^{-4} \leq p \leq 10^{-1}$ and $q=0$.

A very useful and preferred method for the preparation of stimulable phosphors can be found in Research Disclosure Volume 358, February 1994 p 93 item 35841, which is incorporated herein by reference.

In order to produce phosphors with a constant composition and, therefore, with a constant stimulation spectrum for use in storage phosphor panels, even in the presence of co-dopants that influence the position of the stimulation spectrum as e.g. samarium or an alkali metal, added to the raw mix of base materials in small amounts as prescribed in EP-A 0 533 234, a solution therefore has been proposed in U.S. Pat. No. 5,517,034.

Therein a method of recording and reproducing a penetrating radiation image has been proposed comprising the steps of:

(i) causing stimulable storage phosphors to absorb said penetrating radiation having passed through an object or emitted by an object and to store energy of said penetrating radiation, (ii) stimulating said phosphors with stimulating light to release at least a part of said stored energy as fluorescent light and (iii) detecting said stimulation light, characterized in that said phosphors consist of a mixture of two or more individually prepared divalent europium doped bariumfluorohalide phosphors at least one of which contains (a) co-dopant(s) which co-determine(s) the character of the stimulation spectrum of the co-doped phosphor.

Further particularly suitable divalent europium barium fluorobromide phosphors for use according to that invention correspond to the empirical formula (I) of EP-A 0 533 236 and contain in addition to the main dopant $Eu^{2+}$ at least one alkali metal, preferably sodium or rubidium, as a co-dopant. Preferred photostimulable phosphors according to that application contain samarium with respect to barium in an atom percent in the range of $10^{-3}$ to 10 at %. Other preferred photostimulable phosphors according to that application contain an alkali metal selected from the group consisting of Li, Na, K, Rb and Cs, with respect to barium in an atom percent in the range of $10^{-2}$ to 1 at %.

In praxis a maximum in the stimulation spectrum for e.g. lithium fluxed stimulable europium activated bariumfluorohalide phosphor can be found between 520 and 550 nm, whereas for cesium fluxed phosphor its maximum is situated between 570 and 630 nm. Maxima for the stimulation spectra of said phosphors after making a mixture thereof can be found at intermediate wavelengths. The stimulation spectrum of said mixture is further characterized in that the emission intensity at 500 nm stimulation is always lower than the emission intensity at 600 nm. The broadening of the obtained stimulation spectra is a further advantage resulting from the procedure of making blends in that the storage panel in which the stimulable phosphors are incorporated is sensitive to a broad region of stimulation wavelengths in the visible range of the wavelength spectrum. As a consequence the storage panel comprising a layer with the phosphor blends described hereinbefore may offer universal application possibilities from the point of view of stimulation with different stimulating light sources. Different stimulating light sources that may be applied are those that have been described in Research Dislosure No. 308117, December 1989.

A radiographic screen according to the present invention can be prepared by the following manufacturing process.

The phosphor layer can be applied to the support by any coating procedure, making use of solvents for the binder of the phosphor containing layer as well as of useful dispersing agents, useful plasticizers, useful fillers and subbing or interlayer layer compositions that have been described in extenso in the EP-A 0 510 753.

Phosphor particles may be mixed with dissolved rubbery and/or elastomeric polymers, in a suitable mixing ratio in order to prepare a dispersion. Said dispersion is uniformly applied to a substrate by a known coating technique as e.g. doctor blade coating, roll coating, gravure coating or wire bar coating, and dried to form a luminescent layer fluorescing by X-ray irradiation and called hereinafter fluorescent layer. Further mechanical treatments like compression to lower the void ratio is not required within the scope of the present invention.

Useful dispersing agents to improve the dispersibility of the phosphor particles dispersed into the coating dispersion are described in EP-A 0 510 753 as well as a variety of additives that can be added to the phosphor layers such as a plasticizer for increasing the bonding between the binder and the phosphor particles in the phosphor layer and, according to the present invention, to a light-reflecting or absorbing filler and/or a colourant.

Useful plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; polymeric plastizers, e.g. and polyesters of polyethylene glycols with aliphatic dicarboxylic acids such as polyester of triethylene glycol with adipic acid and polyester of diethylene glycol with succinic acid.

The stimulable phosphor is preferably protected against the influence of moisture by adhering thereto chemically or physically a hydrophobic or hydrophobizing substance. Suitable substances for said purpose are described e.g. in U.S. Pat. No. 4,138,361.

In the composition of a storage panel, one or more additional layers are occasionally provided between the support and the phosphor containing layer, having subbing or interlayer layer compositions, in order to improve the bonding between the support and the phosphor layer, or in order to improve the sensitivity of the screen or the sharpness and resolution of an image provided thereby. For instance, a subbing layer or an adhesive layer may be provided by coating polymer material over the surface of the support on the phosphor layer side.

Additional layer(s) may be coated on the support either as a backing layer or interposed between the support and the intermediate layer, the said intermediate layer and the phosphor containing layer(s). Several of said additional layers may be applied in combination.

In the preparation of the phosphor screen having a primer layer between the substrate and the layer containing the phosphor(s), the primer layer is provided on the substrate beforehand, and then the phosphor dispersion is applied to the primer layer and dried to form the fluorescent layer.

When the phosphors are used in combination with a binder to prepare a screen or a panel according to the present invention, the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per $cm^3$ of dry coating).

After applying the coating dispersion onto the support, the coating dispersion is heated slowly to dryness in order to complete the formation of a phosphor layer. In order to remove as much as possible entrapped air in the phosphor coating composition it can be subjected to an ultra-sonic treatment before coating.

After the formation of the phosphor layer, a protective layer is generally provided on top of the fluorescent layer.

Correlating features of roughness and thickness of the protective coating conferring to the screens of the present invention having desirable and unexpected properties of ease of manipulation and excellent image sharpness have been described in the EP-A 0 510 754.

According to a preferred embodiment the coating of the protective layer here proceeds by screen-printing (silk-screen printing).

The protective coating composition may be applied by a rotary screen printing device as has been described in detail in the said EP-A 0 510 753. Very useful radiation curable compositions for forming a protective coating contain as primary components:

(1) a crosslinkable prepolymer or oligomer,
(2) a reactive diluent monomer, and in the case of an UV curable formulation
(3) a photoinitiator.

Examples of suitable prepolymers for use in a radiation-curable composition applied to the storage panel according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryl-type end groups are described in published EP-A 207 257 and Radiat. Phys. Chem., Vol. 33, No. 5, 443–450 (1989). The latter liquid copolyesters are substantially free from low molecular weight, unsaturated monomers and other volatile substances and are of very low toxicity (ref. the journal Adhasion 1990 Heft 12, page 12). The preparation of a large variety of radiation-curable acrylic polyesters is given in German Offenlegungsschrift No. 2838691. Mixtures of two or more of said prepolymers may be used. A survey of UV-curable coating compositions is given e.g. in the journal "Coating" 9/88, p. 348–353.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition.

A photosensitizer for accelerating the effect of the photoinitiator may be present. Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc.

A particularly preferred photoinitiator is 2-hydroxy-2methyl-1-phenyl-propan-1-one which product is marketed by E. Merck, Darmstadt, Germany, under the tradename DAROCUR 1173. The above mentioned photopolymerisation initiators may be used alone or as a mixture of two or more. Examples of suitable photosensitisers are particular aromatic amino compounds as described e.g. in GB-A 1,314,556, 1,486,911, U.S. Pat. No. 4,255,513 and merocyanine and carbostyril compounds as described in U.S. Pat. No. 4,282,309.

When using ultraviolet radiation as curing source the photoinitiator which should be added to the coating solution will to a more or less extent also absorb the light emitted by the phosphor thereby impairing the sensitivity of the radiographic screen, particularly when a phosphor emitting UV or blue light is used. Electron beam curing may therefore be more effective.

The protective coating of the present storage panel is given an embossed structure following the coating stage by passing the uncured or slightly cured coating through the nip of pressure rollers wherein the roller contacting said coating has a micro-relief structure, e.g. giving the coating an embossed structure so as to obtain relief parts as has been described e.g. in EP-A's 455 309 and 456 318.

A suitable process for forming a textured structure in a plastic coating by means of engraved chill roll is described in U.S. Pat. No. 3,959,546.

According to another embodiment the textured or embossed structure is obtained already in the coating stage by applying the paste-like coating composition with a gravure roller or screen printing device operating with a radiation-curable liquid coating composition the Hoeppler-viscosity of which at a coating temperature of 25° C. is between 450 and 20,000 mpa.s.

To avoid flattening of the embossed structure under the influence of gravitation, viscosity and surface shear the radiation-curing is effected immediately or almost immediately after the application of the liquid coating. The rheologic behaviour or flow characteristics of the radiation-curable coating composition can be controlled by means of so-called flowing agents. For that purpose alkylacrylate ester copolymers containing lower alkyl (C1–C2) and higher alkyl (C6–C18) ester groups can be used as shear controlling agents lowering the viscosity. The addition of pigments such as colloidal silica raises the viscosity.

A variety of other optional compounds can be included in the radiation-curable coating composition of the present radiographic article such as compounds to reduce static electrical charge accumulation, plasticizers, matting agents, lubricants, defoamers and the like as has been described in EP-A 0 510 753. In that document a description has also been given of the apparatus and methods for curing, as well as a non-limitative survey of X-ray conversion screen phosphors, of photostimulable phosphors and of binders of the phosphor containing layer.

The edges of the screen, being especially vulnerable by multiple manipulation, may be reinforced by covering the edges (side surfaces) with a polymer material being formed essentially from a moisture-hardened polymer composition prepared according to EP-A 0 541 146.

Support materials for radiographic screens which in accordance with specific embodiments of the present invention are preferably plastic films such as films of cellulose acetate, polyvinyl chloride, polyvinyl acetate, polyacrylonitrile, polystyrene, polyester, polyethylene terephthalate, polyethylene naphthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like.

Examples of preferred supports include polyethylene terephthalate, clear or blue coloured or black coloured (e.g., LUMIRROR C, type X30 supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties.

These supports may have thicknesses which may differ depending on the material of the support, and may generally be between 50 and 1000 $\mu$m, more preferably between 80 and 500 $\mu$m depending on handling properties. Further are mentioned glass supports and metal supports.

Normally the screens described hereinbefore are applied for medical X-ray diagnostic applications but according to a particular embodiment the present radiographic screens may be used in non-destructive testing (NDT), of metal objects, where more energetic X-rays and γ-rays are used than in medical X-ray applications. Especially in the said applications further glass and metal supports are used, the latter preferably of high atomic weight, as described e.g. in U.S. Pat. Nos. 3,872,309 and 3,389,255.

According to a particular embodiment for industrial radiography the image-sharpness of the phosphor screen is improved by incorporating in the phosphor screen between the phosphor-containing layer and the support and/or at the rear side of the support a pigment-binder layer containing a non-fluorescent pigment being a metal compound, e.g. salt or oxide of lead, as described in Research Disclosure September 1979, item 18502.

In order to obtain a reasonable signal-to-noise ratio (S/N) the stimulation light should be prevented from being detected together with the fluorescent light emitted on photostimulation of the storage phosphor. Therefore a suitable filter means is used preventing the stimulation light from entering the detecting means, e.g. a photomultiplier tube. Because the intensity ratio of the stimulation light is markedly higher than that of the stimulated emission light, i.e. differing in intensity in the range of $10^4:1$ to $10^6:1$ (see published EP-A 0 007 105, column 5) a very selective filter should be used. Suitable filter means or combinations of filters may be selected from the group of : cut-off filters, transmission bandpass filters and band-reject filters. A survey of filter types and spectral transmittance classification is given in SPSE Handbook of Photographic Science and Engineering, Edited by Woodlief Thomas, Jr.—A Wiley-Interscience Publication—John Wiley & Sons, New York (1973), p. 264–326.

The fluorescent light emitted by photostimulation is detected preferably photo-electronically with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversion of the electrical signals corresponding with the light obtained through photostimulation are displayed on a cathode-ray tube. Before display the signals may be processed by computer. Conventional image processing techniques can be applied to reduce the signal-to-noise ratio of the image and enhance the image quality of coarse or fine image features of the radiograph.

The invention is illustrated by the following examples without however limiting it thereto. Important concerning image quality as reflected in S-SWR measuring methods will be described hereinafter in the examples.

EXAMPLES

Definitions and methods used.
Measurement of sensitivity S and square wave response SWR for stimulable phosphor screens For the photostimulable phosphor screens coated with BaSrFBr:Eu$^{2+}$ phosphor the measurement of S and SWR was carried out with an image scanner made up with a He-Ne laser. The beam of a 10 mW red He-Ne laser is focussed to a small spot of 140 μm (FMWH) with an optic containing a beamexpander and a collimating lens. A mirror galvanometer is used to scan this small laserspot over the entire width of a phosphor sample. During this scanning procedure the phosphor is stimulated and the emission light is captured by an array of optical fibers which are sited on one line. At the other end of the optical fibers being mounted in a circle a photomultiplier is situated.

To attenuate the stimulating light an optical filter, type BG3 from SCHOTT, is placed between the fiber and the photomultiplier. In this way only the light emitted by the phosphor is measured. The small current of the photomultiplier is first amplified with an I/V convertor and digitalised with an A/D convertor.

The measuring set up is connected with a HP 9826 computer and a HP 6944 multiprogrammer to controll the measurement. Starting the procedure an electronic shutter is closed to shut down the laser. A phosphor sample measuring 50 mm×210 mm is excited with a 85 kV X-ray source provided with an aluminum filter having a thickness of 21 mm. The radiation dose is measured with a FARMER dosemeter. Between the X-ray source and the phosphor layer a thin lead-raster containing 6 different spatial frequencies is mounted to modulate the X-ray radiation. Frequencies used are 0.50, 1.00, 2.00 and 3.00 line pairs per mm. After exposure the sample is put into the laser scanner. To read out one line the shutter is opened and the galvanometer is moved linearly. During the scanning procedure the emitted light is measured continuously with the A/D convertor at a sampling rate frequency of 100 kHz and stored within a memory card in the multiprogrammer. One scan thus contains 100000 pixels. Once the scan is complete the shutter is closed again and the galvanometer is put on his original position again.

The data of the scan line are transferred from the memory card in the multiprogrammer to the computer where said data are analysed. A first correction takes into account the sensitivity variation of the scan line with the distance. Therefore a calibration scan was measured previously for a phosphor sample that was exposed quite homogeneously. A second correction takes into account the amount of X-ray dose by dividing said values by the said dose amount.

The different blocks are separated and the amplitude on each spatial frequency is calculated, making use of Fourier analysis. The amplitude of the first block having a spatial frequency of 0.025 line pairs per mm is taken as the sensitivity of the stimulable phosphor screen. The other values are the results for the curve of the Square Wave Response (SWR: SWR1 referring to the response at 1 line pair per mm; SWR2 to the response at 2 line pairs per mm) which is representative for the resolution of the screen.
Composition of the screens

| Antihalation undercoat layer: Solution A: | | |
|---|---|---|
| MOWILITH CT5 (from HOECHST AG) | 300 | g |
| Ethanol | 700 | g |
| CYMEL 300 | 60 | g |
| p-toluene sulphonic acid | 12 | g |
| Solution B: | | |
| Dye-1 | 0.750 | g |
| Ethanol | 150 | g |
| Sodium hydroxide | 0.08 | g |
| *16 hours after its preparation solution B is filtered off: a red-brown solution is obtained. | | |

| -continued | | |
|---|---|---|
| Coating solution: | | |
| Solution A | 33.3 | g |
| Solution B | 3.0 | g |
| Ethanol | 63.6 | g |

The coating solution was coated by dipcoating techniques at a rate of 4 m per minute on a polyethylene terephthalate support (see further Table 1) having reflecting properties (containing BaSO$_4$ particles) or absorbing properties (having carbon black particles). Thermal curing was performed over one night at 80° C. after drying.

Properties of the thus obtained antihalation layer.

An absorption of 0.22 at a wavelength of 633 nm (HeNe laser emission wavelength). No substantial absorption is measured at the emission wavelength of the stimulable phosphor (having its maximum emission at 390 nm).

| Phosphor layer composition: | | |
|---|---|---|
| BAEROSTAB M36 (from Bärlöcher GmbH) | 1.5 | g |
| DISPERSE AYD 9100 (from Daniel Produkts Company) | 0.75 | g |
| KRATON FG19101X (from Shell Chemicals) | 12.5 | g |
| BaSrFBr:Eu (mean particle size: 7 μm) | 270 | g |
| BaSrFBr:Eu (mean particle size: 3 μm) | 30 | g |

Preparation of the phosphor laquer composition:

BAEROSTAB M36, DISPERSE AYD 9100 and KRATON FG19101X were dissolved while stirring in the prescribed amounts in 61.5 g of a solvent mixture from wash benzine 100–120, toluene and butyl acrylate in ratios by volume of 50:30:20. The phosphors were added thereafter and stirring was further proceeded for another 10 minutes at a rate of 1700 r.p.m..

The composition was doctor blade coated at a coating rate of 2.5 m per minute onto a subbed 175 μm thick polyethylene terephthalate support and dried at room temperature during 30 minutes. In order to remove volatile solvents as much as possible the coated phosphor plate was dried at 90° C. in a drying stove.

It has been established that a layer composition was obtained having good curable properties. Moreover no diffusion of colorant was found from the intermediate antihalation layer between support and phosphor layer to the phosphor layer: this particular dye is advantageously soluble in ethanol but insoluble in solvents present in the coating composition of the phosphor layer.

In Table I the coating composition is given for the stimulable phosphor. For each screen sample the following data referring to the composition are summarised in the respective Tables:

- number of the sample (Matl. No.)
- support: expressed as % reflectance: 0–10% corresponds to a support having carbon black dispersed in the support material; 85–100% to a support having BaSO$^4$ dispersed therein;
- presence of antihalation undercoat layer (AHU): yes (Y) or no (N);
- phosphor coverage weight (PCW) (between 70 and 90 mg/cm$^2$).
- presence (N=No) and, if present, amount of dye in the phosphor layer;
- screen speed (a higher figure refers to a more sensitive screen);
- SWR1 and SWR2 values respectively.

TABLE I

| | Stimulable phosphor screens with BaSrFBr:Eu$^{2+}$ as a stimulable phosphor. | | | | | | |
|---|---|---|---|---|---|---|---|
| Matl. No. | Support (% refl.) | AHU | PCW (mg/cm$^2$) | DYE | SPEED | SWR1 | SWR2 |
| 1 | 85–100 | Y | 69 | N | 135 | .70 | .37 |
| 2 | 85–100 | Y | 78 | N | 150 | .67 | .34 |
| 3 | 0–10 | N | 79 | N | 132 | .68 | .36 |
| 4 | 0–10 | N | 90 | N | 146 | .66 | .33 |
| 5 | 0–10 | N | 85 | N | 143 | .67 | .34 |
| 6 | 0–10 | N | 86 | 0.006%* | 138 | .68 | .36 |
| 7 | 0–10 | N | 87 | 0.06%* | 108 | .73 | .43 |

*solution B (in volume %)

As is clear from the data related with speed and sharpness the highest (most preferred) values are attained for materials Nos. 1 and 2 (both having an antihalation undercoat and a reflective support): an increased amount of phosphor coated makes speed increase, without a remarkable decrease in sharpness. Addition of antihalation dye in minor amounts to the phosphor layer alone as in material No. 6 having no reflection layer also leads to a suitably good relationship between speed and sharpness.

I claim:

1. A radiation image storage panel having a support, an intermediate layer and a phosphor layer comprising a binder and a stimulable phosphor dispersed therein, said panel being colored with a colorant so that the mean reflectance of said panel in the wavelength region of the stimulating rays for said stimulating phosphor is lower than the mean reflectance of said panel in the wavelength region of the light emitted by said stimulable phosphor upon stimulation thereof, characterized in that said colorant is a triarylmethane dye having at least one aqueous alkaline soluble group and is present in at least one of said support, said phosphor layer or an intermediate layer between said support and said phosphor layer.

2. A radiation image storage panel according to claim 1, wherein the said colorant is a triphenylmethane dye according to the general formula (I), (I)

wherein $R^1$–$R^8$ each independently represents hydrogen, alkyl or aryl, provided that at least one of $R^1$–$R^8$ represents an acidic group.

3. A radiation image storage panel according to claim 1, wherein the said colorant has a structure corresponding to formula (II)

(II)

4. A radiation image storage panel according to claim 1, wherein the said support has a reflectance percentage of from 45 to 60% in the wavelength range from 350 to 600 nm.

5. A radiation image storage panel according to claim 1, wherein the said intermediate layer has a reflectance percentage of from 85 to 100% in the wavelength range from 350 to 600 nm.

6. A radiation image storage panel according to claim 1, wherein the said support is covered with an aluminum layer which is present between the said support and the said intermediate layer.

7. A radiation image storage panel according to claim 1, wherein the wavelength region of the stimulating rays is between 500 and 700 nm.

8. A radiation image storage panel according to claim 1, wherein the wavelength region of light emitted by said stimulable phosphor upon stimulation thereof is between 350 and 450 nm.

9. A radiation image storage panel according to claim 1, wherein the said binder is a rubbery binder substantially consisting of one or more block copolymers, having a saturated elastomeric midblock and a thermoplastic styrene endblock, as rubbery and/or elastomeric polymers.

10. A radiation image storage panel according to claim 1, wherein said stimulable phosphor has a composition according to the formula $$Ba_{1-x-y-p-3q-z}Sr_xM_y^{2+}M_{2p}^{1+}M_{2q}^{3+}F_{2-a-b}Br_aI_b:zEu$$

wherein:
M$^{1+}$ is at least one alkali metal selected from the group consisting of Li, Na, K, Rb and Cs;
M$^{2+}$ is at least one divalent metal selected from the group consisting of Ca, Mg and Pb;
M$^{3+}$ is at least one trivalent metal selected from the group consisting of Al, Ga, In, Tl, Sb, Bi, Y and a trivalent lanthanide;
$0 \leq x \leq 0.30$, $0 \leq y \leq 0.10$, $10^{-6} \leq z \leq 0.2$,
$0 \leq p \leq 0.3$, $0 \leq q \leq 0.1$,
$0.05 \leq a \leq 0.76$, $0.20 \leq b \leq 0.90$ and $a+b<1.00$.

11. A radiation image storage panel according to claim 10, wherein said trivalent lanthanide is selected from the group consisting of La, Ce, Pr, Nd, Sm, Gd, Tb, Dy, Ho, Er, Tm, Yb, and Lu.

12. A radiation image storage panel according to claim 1, wherein said stimulable phosphor has a composition according to the formula $$Ba_{1-x-y-p-3q-z}Sr_xM_y^{2+}M_{2p}^{1+}M_{2q}^{3+}F_{2-a-b}Br_aI_b:zEu$$

wherein:
M$^{1+}$ is at least one alkali metal selected from the group consisting of Li, Na, K, Rb and Cs;
M$^{2+}$ is at least one divalent metal selected from the group consisting of Ca, Mg and Pb;
M$^{3+}$ is at least one trivalent metal selected from the group consisting of Al, Ga, In, Ti, Sb, Bi, Y and a trivalent lanthanide;
$0.06 \leq x \leq 0.20$, $0 \leq y \leq 0.10$, $10^{-6} \leq z \leq 0.2$,
$0 \leq p \leq 0.3$, $0 \leq q \leq 0.1$,
$0.05 \leq a \leq 0.76$, $0.20 \leq b \leq 0.90$ and $0.85 \leq a+b \leq 0.96$.

13. A radiation image storage panel according to claim 1, wherein said stimulable phosphor has a composition according to the formula $$Ba_{1-x-y-p-3q-z}Sr_xM_y^{2+}M_{2p}^{1+}M_{2q}^{3+}F_{2-a-b}Br_aI_b:zEu$$

wherein:
M$^{1+}$ is Rb or Cs;
M$^{2+}$ is Pb;
M$^{3+}$ is at least one trivalent metal selected from the group consisting of Al, Ga, In, Tl, Sb, Bi, Y and a trivalent lanthanide;
$0.06 \leq x \leq 0.20$, $10^{-4} \leq y \leq 10^{-3}$,
$10^{-4} \leq p \leq 10^{-1}$, $q=0$, $10^{-6} \leq z \leq 0.2$,
$0.05 \leq a \leq 0.76$, $0.20 \leq b \leq 0.90$, and $0.85 \leq a+b \leq 0.96$.

* * * * *